Sept. 1, 1959     R. V. LACKNER ET AL     2,902,572
INDUCTION HEATING OF METAL STRIP
Filed March 5, 1957     6 Sheets-Sheet 1

INVENTORS.
Robert V. Lackner
Neville W. Dingman
BY Webb, Mackay + Burden
THEIR ATTORNEYS

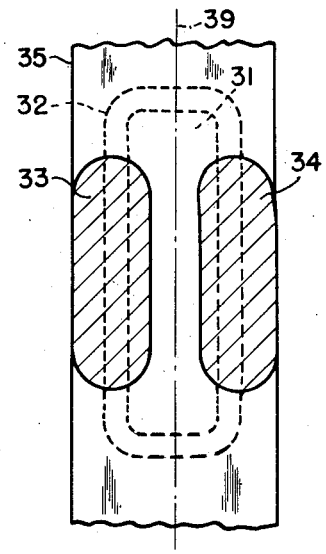
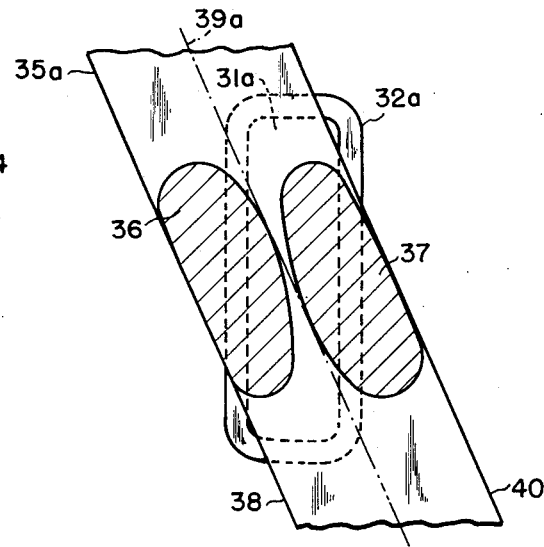
Fig. 8    Fig. 9
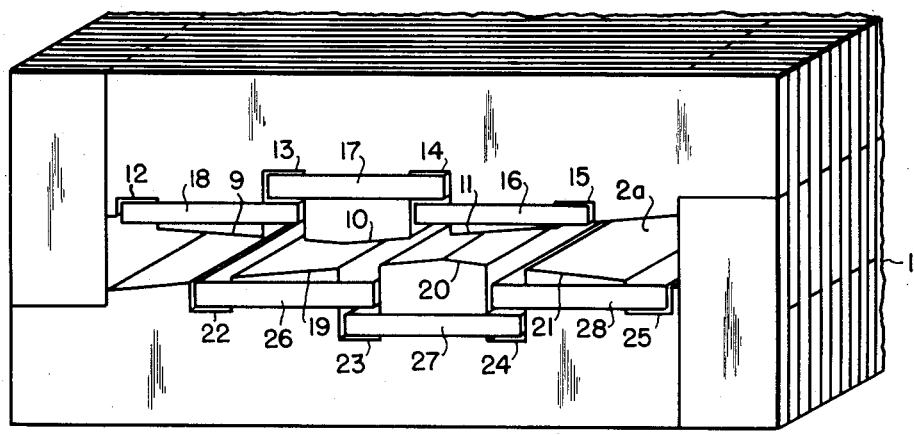
Fig. 10

Sept. 1, 1959  R. V. LACKNER ET AL  2,902,572
INDUCTION HEATING OF METAL STRIP
Filed March 5, 1957  6 Sheets-Sheet 4

INVENTORS.
Robert V. Lackner
Neville W. Dingman
BY Webb, Mackey + Burden
THEIR ATTORNEYS INVENTORS.
Robert V. Lackner
Neville W. Dingman
BY
Webb, Mackay + Burden
THEIR ATTORNEYS Sept. 1, 1959 R. V. LACKNER ET AL 2,902,572
INDUCTION HEATING OF METAL STRIP
Filed March 5, 1957 6 Sheets-Sheet 6

INVENTORS.
Robert V. Lackner
Neville W. Dingman
BY
Webb, Mackey & Burden
THEIR ATTORNEYS

United States Patent Office 2,902,572
Patented Sept. 1, 1959

2,902,572

INDUCTION HEATING OF METAL STRIP

Robert V. Lackner and Neville W. Dingman, Pittsburgh, Pa., assignors to Penn Induction Company, Pittsburgh, Pa., a corporation of Pennsylvania Application March 5, 1957, Serial No. 644,173

56 Claims. (Cl. 219—10.41)

This application is a continuation-in-part of our copending application Serial No. 577,224, filed April 10, 1956.

This invention relates to induction heating apparatus and more particularly to induction furnaces or heaters for heating ferrous and non-ferrous strip and sheet in wide widths and in thin gauges uniformly across its width as the strip or sheet move continuously through the apparatus. The heating of the metal strip results from inducing electrical currents therein as the strip passes longitudinally through a magnetic field of transverse lines of flux. By the term magnetic field of transverse lines of flux as used in this specification and claims, we mean a magnetic field in which the lines of flux are substantially normal to the surface of the strip. Copper, aluminum, brass, titanium, and steels, both magnetic and non-magnetic, are metals for which our invention is especially adapted.

Generally, induction furnaces for heating continuously traveling strip comprise a pair of fixed field structures positioned relative to one another to form a wide shallow work passage. The strip moves longitudinally through this work passage and passes through a magnetic field of transverse lines of flux which substantially fill the work passage and extend transversely to the strip. This magnetic field results from energization of the field structure by single phase, alternating current, either low frequency or high frequency. Usually a field structure comprises a series of poles separated from one another by slots which receive coils or windings for energizing the poles. These windings are connected to a single phase alternating current.

Uniform heating across the width of metal strip and sheet, particularly strip and sheet which have wide widths relative to their gauge avoids buckling and warping of the metal. This is particularly true where the sheet and strip have thin gauges. Uniform heating across the width of metal strip and sheet produces a uniform grain structure in the strip which is highly desirable for deep drawing work. Heretofore, heating of metal strip and sheet by induction furnaces and heaters has presented serious problems, particularly in widths above 6". One problem has been overheating of the strip edges as compared to the central parts of the strip. Excessive heating of the strip edges is caused by a concentration of magnetic lines of flux at the strip edges. Thus, uniform heating across strip widths above 6" has been impossible unless additional devices are employed at the strip edges.

Efforts have been made to reduce or eliminate this excessive edge heating by employing shields which protect the edges from this concentration of lines of flux. However, such efforts have not proven wholly satisfactory for they require additional equipment, and they render it difficult to uniformly heat the edges relative to the central parts of the metal strip inasmuch as the shields prevent lines of flux from traveling through the edge areas of the material.

A second problem encountered in uniformly heating strip has been localized heating across the strip width, thereby effecting uneven heating widthwise. This localized heating, like the excessive edge heating, is due to non-uniform distribution of lines of flux across the width of the material.

Our invention, which employs a magnetic field of transverse flux, efficiently heats by induction, metal sheet and strip in wide widths and in thin gauges uniformly across its width. It effects this uniform heating without any special auxiliary equipment such as shields for the strip edges. To achieve such uniform heating, we use induction heating apparatus comprising a magnetizable core structure having a work passage extending lengthwise therethrough for movement of strip through the core structure. The core structure forms the sides of the work passage. Arranged across each side of the passage are at least two poles, each having at least one energizing coil. Each of the poles extends lengthwise along its respective side of the work passage. Connected to each coil is a source of power for producing a field of transverse magnetic flux across the work passage. The work passage extends diagonally through the field of transverse magnetic flux. To move metal strip through the work passage, we provide means such as sets of pinch rolls, reels, or other devices capable of moving the strip through the work passage.

In the accompanying drawings, we have shown preferred embodiments of our invention, in which:

Figure 8 is a sketch showing heating patterns of strip drawn across a pole face parallel to the longitudinal axis of a magnetic field generated by the pole;

Figure 9 is a sketch showing heating patterns of strip drawn diagonally across a pole face;

Figure 10 is an isometric view of a modification of our invention;

Figure 1:
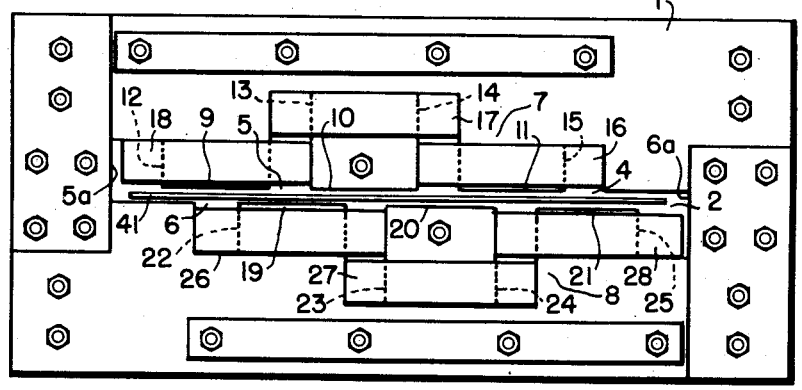
Figure 1 is a side elevation view of one embodiment of our invention in induction heating apparatus.
Figure 2:
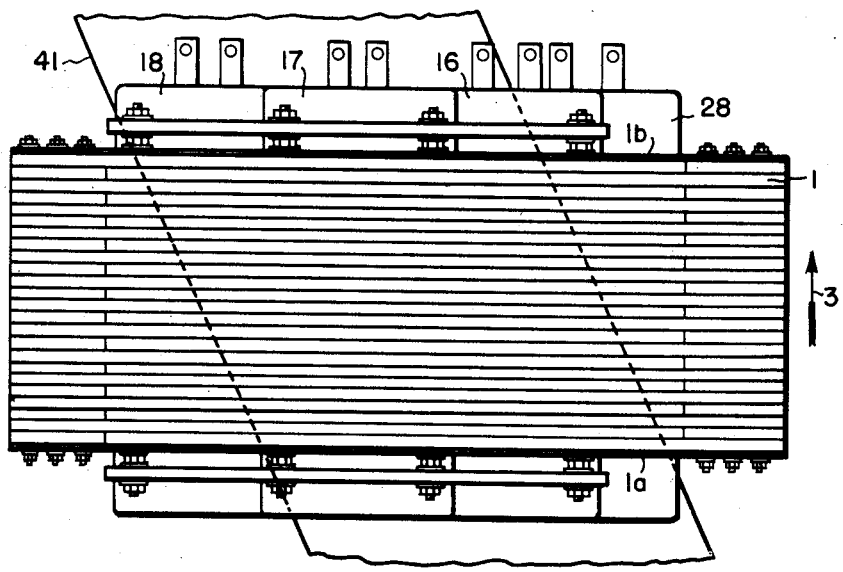
Figure 2 is a plan view of the apparatus shown in Figure 1.

As shown in Figures 1, 2, 3 and 4, one embodiment of our induction heating apparatus comprises a laminated core structure 1 of silicon steel. Extending lengthwise through the core structure is a work passage through which metal strip or sheet 41 may travel continuously. As shown in these figures, the passage has a thin, generally rectangular cross section and extends from one side 1a of the core structure through to the other side 1b. The passage has two long sides 5 and 6 and two ends 5a and 6a. The core structure forms the periphery of the cross section of the work passage. An arrow 3 in Figure 2 shows the direction of strip travel.

The work passage is made as small as feasible from a vertical dimension standpoint (viewing Figure 1) to obtain a minimum reluctance in a magnetic field 4 of transverse lines of flux which substantially fill the work passage. At the same time, the vertical dimension must be of sufficient magnitude to provide clearance for strip travel through the work passage. Specifically, in one apparatus for sheet or strip having a gauge range of .004″–.050″, the vertical dimension is ⅝″.

Figure 10 shows a modification of our invention in which a work passage 2a has a cross-sectional contour in which the sides of the work passage taper at an angle of substantially 2 to 6 degrees from each end toward the center of their respective sides. Thus, the work passage adjacent the center of each side has a smaller vertical dimension (viewing Figure 8) than at the ends of each side. The cross-sectional contour of this work passage as well as of the work passage in the core structure shown in Figure 1 is substantially the same throughout the length of the passages.

The work passage 2 divides the core structure 1 into two field structures 7 and 8, one on each side of the passage. Each field structure constitutes an integral part of the core structure. Field structure 7 has three poles 9, 10 and 11, spaced across the width of a side 5 of the passage and disposed substantially longitudinally relative to the passage. As shown in Figure 2, poles 9, 10 and 11 extend lengthwise substantially through the passage from one side 1a of the side core structure to the other side 1b of the core structure. Slots 12, 13, 14 and 15 separate the poles from each other and receive energizing coils 16, 17 and 18 which are wound upon the poles. Field structure 8 likewise has three poles 19, 20 and 21 disposed as the poles in field structure 7 and with slots 22, 23, 24 and 25 separating the poles from one another and receiving therein energizing coils 26, 27 and 28. Each coil has at least one copper conductor of a suitable size and insulated with silicones or any other high temperature insulator. Each of the poles of field structures 7 and 8 may be divided into at least two parts with at least one energizing coil for each part. In other words, instead of each pole being a one-piece structure, it may be a series of pieces with an energizing coil for each piece.

To effect uniform heating of metal strip and sheet across its width, we use a number of poles across each side of the work passage commensurate with the maximum width of the strip to be heated. Specifically, for a furnace designed to heat 20″ maximum widths, we employ three to five poles across a side of the work passage.

Figure 3:
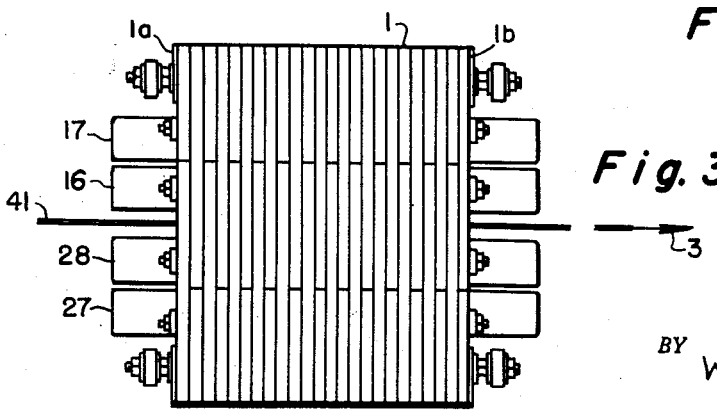
Figure 3 is an end view of the apparatus shown in Figure 1.

As shown in Figures 1, 2 and 3, the poles 9, 10 and 11 have a staggered arrangement across side 5 of the work passage relative to poles 19, 20 and 21 on side 6. In other words, in no instance is a slot on side 5 opposite a slot on side 6 or is a longitudinal center line of a pole face on side 5 opposite a longitudinal center line of a pole face on the opposite side of the work passage. This pole and slot arrangement provides a uniform distribution of lines of flux across the width of the work passage (Figure 4), thereby materially assisting in obtaining even heating of the strip across its width.

Single phase alternating current connected to each coil produces a magnetic field of transverse flux throughout substantially the whole work passage 2. High or low frequency electric current may be used.

Figure 5:
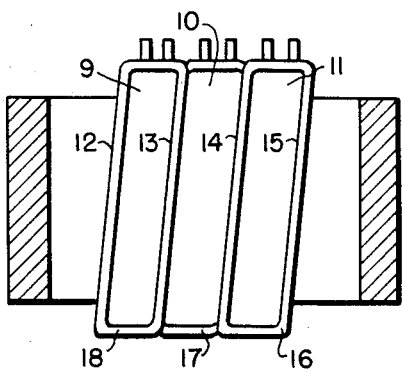
Figure 5 is a diagrammatic view showing the arrangement of the poles and coils on one side of the work passage of the apparatus of Figure 4.
Figure 6:
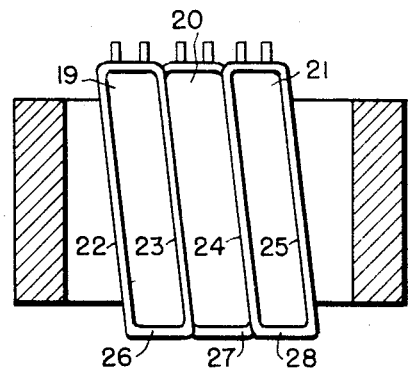
Figure 6 is a diagrammatic view similar to Figure 5 but showing the arrangement of the poles and coils on the opposite side of the work passage.
Figure 7:
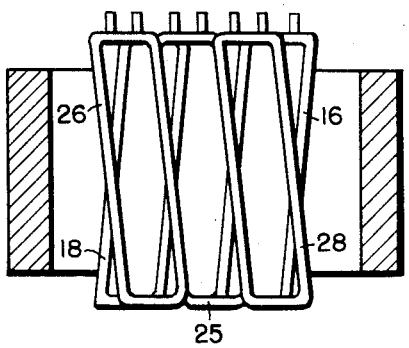
Figure 7 is a diagram showing arrangement of the coils of Figure 5 relative to the coils of Figure 6.

To provide a magnetic field which covers a maximum area of the work passage throughout its length and which has a high uniform flux distribution, the central longitudinal axes of the poles 9, 10 and 11 of field structure 7 extend diagonally relative to the longitudinal axis of the work passage. As shown in Figure 5, the poles and coils are arranged at an angle of substantially 6° to the longitudinal axis of the work passage. Correspondingly, as shown in Figure 6, each pole of the opposite field structure 8 is inclined relative to the axis of the passageway but in the opposite direction. Figure 7 shows the disposition of the poles and coils of Figures 5 and 6 relative to each other. The angular arrangement of the poles and coils relative to the longitudinal axis of the work passage falls into a range of substantially 5 to 15°. The width of strip to be heated and the number of coils positioned across a side of the work passage determine the particular angular arrangement employed. Such a pole arrangement directs lines of flux 30 from field structures 7 and 8 into all parts of the moving strip which would not otherwise have flux linkages. Thus, the width of a length of strip moving through the work passage is subjected to a uniform flux linkage pattern within the work passage which pattern uniformly heats the width.

Figure 4:
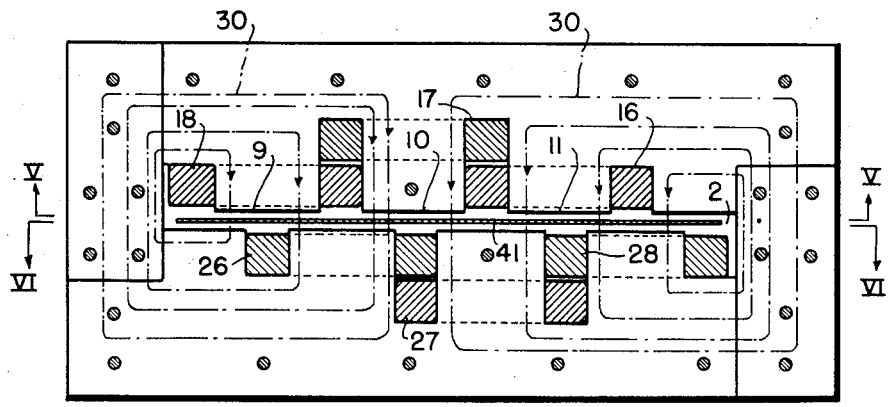
Figure 4 is a view similar to Figure 1 of the apparatus showing the coils in section and showing the paths of travel for the lines of flux.

Each coil is so wound upon its pole or is so connected to a power source that for any given direction of current flow all the poles on one side of the passage 2 have the same polarity and all the poles on the opposite side of the passage have the opposite polarity. Thus, at any instant all the lines 30 of magnetic flux travel in the same direction across the work passage as shown in Figure 4. Enhancement of uniform flux distribution across the width of the passage results from having all the poles on one side of the work passage of the same polarity at any instant, as will be pointed out hereinafter. This polarity relationship also materially assists in providing a path of travel for each line of flux in which each line traverses only one air gap, thereby bringing about operating power economies.

A study of Figures 1 and 4 shows that the lines 30 of transverse magnetic flux in the work passage travel through only one air gap; namely, the vertical dimension of the work passage. Each line of flux has its return path through the core structure as shown in Figure 4. The combination of having each pole on one side of the work passage of the same polarity and each pole on the opposite side of the passage of the opposite polarity for any given direction of current flow and providing a work passage formed by the magnetizable core structure produces the path of travel for each line of flux in which there is only one air gap. If all the poles on one side of the passage did not have the same polarity, then some lines of flux would travel through two air gaps because of the effect of the pole or poles of opposite polarity.

The single air gap path of travel for each line of flux brings about two important results. First, it materially aids in maintenance of a uniform distribution of lines of flux across the width of the work passage, thereby assisting in uniformly heating strip across its width.

Second, it permits operation of our apparatus with uniform flux distribution across the work passage width and with power factors substantially twice those used in prior two air gap induction furnaces which have uneven flux distribution across the work passage width. In addition, prior furnaces with two air gaps require almost twice as much exciting current to set up a magnetic field of equal strength as that required by our apparatus. Thus, users of our apparatus enjoy materially lower operating and installation costs than users of furnaces having two air gaps.

A second embodiment of our invention produces uniform heating across the width of the strip but has a two air gap path of travel for some of its lines of magnetic flux instead of the single air gap path of travel for each line of flux in the embodiment of Figures 1–4 inclusive. While this second embodiment does not have all of the advantages of the single air gap embodiment, specifically it does not have as uniform a distribution of lines of flux across the width of the work passage and it does not have as good a power factor, it nevertheless uniformly heats the strip across its width.

Figure 16:
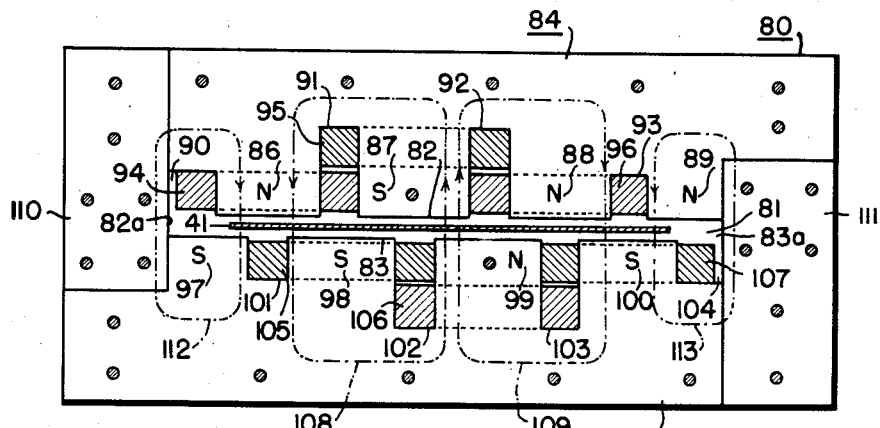
Figure 16 is a side elevation view of a second embodiment of our invention showing the coils in section and the paths of travel for the lines of magnetic flux therein.
Figure 17:
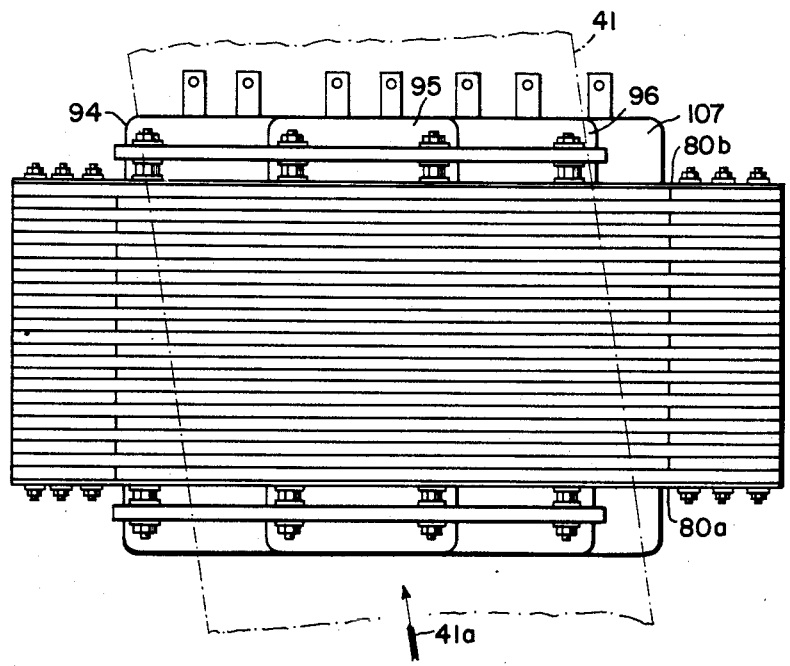
Figure 17 is a plan view of the embodiment of Figure 16.

As shown in Figures 16 and 17, this second embodiment comprises a laminated core structure 80 made from silicon steel. Extending lengthwise through the core structure is a work passage 81 which is identical to the work passage 2 of the embodiment of Figures 1–4 inclusive, and extends from one side 80a of the core structure through to the other side 80b. The work passage 81 has two long sides 82 and 83 and two ends 82a and 83a. The core structure forms the periphery of the cross section of the work passage. Metal strip or sheet 41 travels continuously through this work passage 81 in the direction of the arrow 41a.

The work passage 81 divides the core structure 80 into two field structures 84 and 85, one on each side of the passage. Each field structure is an integral part of the core structure 80 with field structure 84 having four poles 86, 87, 88 and 89 spaced across the width of a side of the passage and disposed substantially longitudinally relative to the passage. These poles 86, 87, 88 and 89 extend lengthwise substantially through the work passage from one side 80a of the core structure to the other side 80b. Slots 90, 91, 92 and 93 separate the poles from each other and receive energizing coils 94, 95 and 96 which are wound upon the poles. Field structure 85 likewise has four poles 97, 98, 99 and 100 disposed similarly to the poles in field structure 84 with slots 101, 102, 103 and 104 separating the poles from one another and receiving therein energizing coils 105, 106 and 107.

As shown in Figures 16 and 17, the poles 86, 87, 88 and 89 have a staggered arangement across their side of the work passage relative to the poles 97, 98, 99 and 100 on the opposite side of the work passage. In no instance is a slot on one side of the work passage opposite a slot on the other side of the work passage on which a longitudinal center line of a pole face on one side of the work passage opposite a longitudinal center line of a pole face on the other side of the work passage.

Single phase alternating current connected to each coil produces a magnetic field of transverse flux throughout substantially the whole work passage 81.

Each coil is so wound upon its pole or is so connected to a power source that for any given direction of current flow, poles 86, 88 and 89 of field structure 84 and pole 99 of field structure 85 have the same polarity, and pole 87 of field structure 84 together with poles 97, 98 and 100 of field structure 85 have the opposite polarity. For example, as shown in Figure 16 for one direction of current flow, poles 86, 88, 89 and 99 are north poles as indicated by the "N" designation and poles 87, 97, 98 and 100 are south poles as indicated by the "S" designation. Thus lines of flux 108 and 109 pass through two air gaps; i.e., one when the line of flux 108 travels from the north pole 86 to the south pole 98 across the work passage, and a second when it travels from the north pole 99 to the south pole 87.

The core structure 80, like the core structure 1, with ends 110 and 111 connecting the two field structures 84 and 85 has ability to effect good temperature control in heating the ends of the strip traveling through the work passage 81. This ability to closely control temperatures of the ends of the strip results from the magnetic lines of flux 112 and 113 adjacent to the ends of the work passage having a single air gap path of travel as compared with the magnetic lines of flux 108 and 109 in the center portions of the work passage which have a two air gap path of travel. Since the lines of flux 112 and 113 have a single air gap path of travel, less magnetizing current is required to produce the requisite flux density in the ends of the work passage for heating the ends of the strip than is required for lines of flux having a two air gap path of travel. Because less magnetizing current is required, we effect a closer control over the flux density at the ends of the work passage and thus bring about good control of heating the ends of the strip.

A third embodiment of our invention effects uniform heating across the width of the strip but lacks some of the advantages of the embodiments of Figures 1–4 inclusive and of Figures 16 and 17. This third embodiment has a two air gap path of travel for each of its lines of magnetic flux and hence, does not have the advantages of the single air gap embodiment of Figures 1–4 inclusive set forth above. In addition, it does not have the advantage of close control of heating the ends of the strip traveling through the apparatus. This third embodiment brings about uniform heating across the width of the strip by control of the amount of flux generated by each pole as described hereinafter.

Figure 18:
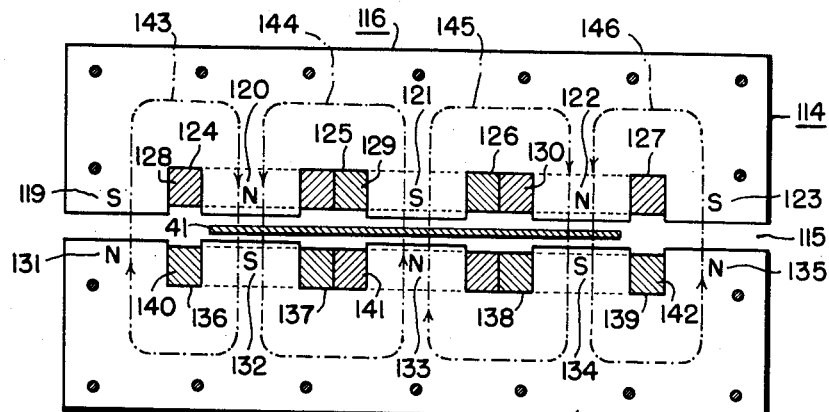
Figure 18 is a side elevation view of a third embodiment of our invention showing the coils in section and the paths of travel for the lines of magnetic flux therein.
Figure 19:
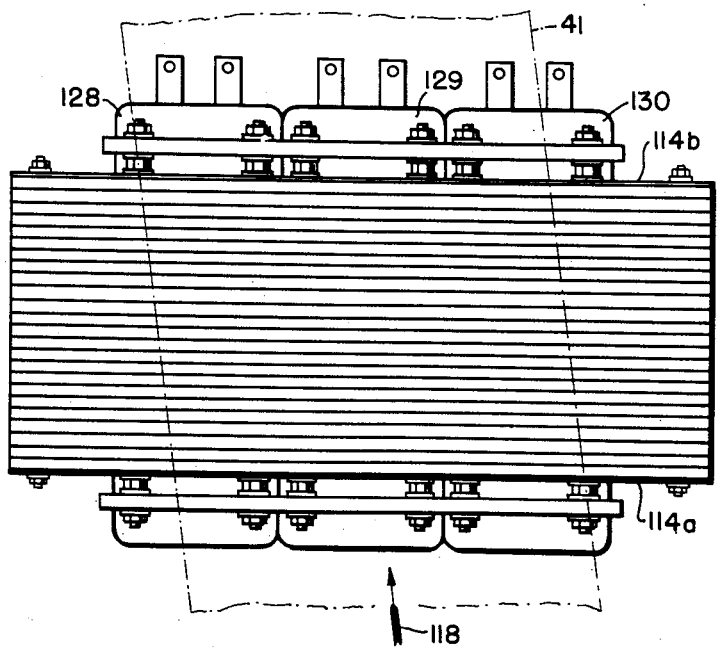
Figure 19 is a plan view of the embodiment of Figure 18.

As shown in Figures 18 and 19, this third embodiment comprises a magnetizable core structure 114 having a work passage 115 extending lengthwise therethrough for movement of strip through the core structure. The core structure 114 has a pair of electromagnetic field structures 116 and 117 made from laminated silicon steel and spaced apart to form the work passage 115. This work passage extends lengthwise between the two field structures and the metal strip or sheet 41 travels continuously therethrough in the direction of the arrow 118.

The field structure 116 has five poles 119, 120, 121, 122 and 123 spaced across the width of the field structure and disposed substantially longitudinally relative to the work passage 115. The poles 119, 120, 121, 122 and 123 extend lengthwise substantially through the work passage from one side 114a of the core structure to the other side 114b. Slots 124, 125, 126 and 127 separate the poles from each other and receive energizing coils 128, 129 and 130 which are wound upon the poles. Field structure 117 likewise has five poles 131, 132, 133, 134, and 135 disposed similarly to the poles of field structure 116 with slots 136, 137, 138 and 139 separating the poles from one another and receiving therein energizing coils 140, 141 and 142.

Single phase alternating current connected to each coil produces a magnetic field of transverse flux throughout substantially the whole work passage 115.

Each coil is so wound upon its pole or is so connected to a power source that for any given direction of current flow, poles 120 and 122 of field structure 116 and poles 131, 133 and 135 of field structure 117 have the same polarity, and poles 119, 121 and 123 of field structure 116 together with poles 132 and 134 of field structure 117 have the opposite polarity. For example, as shown in Figure 18 for one direction of current flow, poles 120, 122, 131, 133 and 135 are north poles as indicated by the "N" designation and poles 119, 121, 123, 132 and 134 are south poles as indicated by the "S" designation. Thus lines of flux 143, 144, 145 and 146 pass through two air gaps; i.e., one when the line of flux 144 travels from the north pole 120 to the south pole 132 across the work passage 115, and a second when it travels from the north pole 133 to the south pole 121 across the work passage 115.

Figure 11:
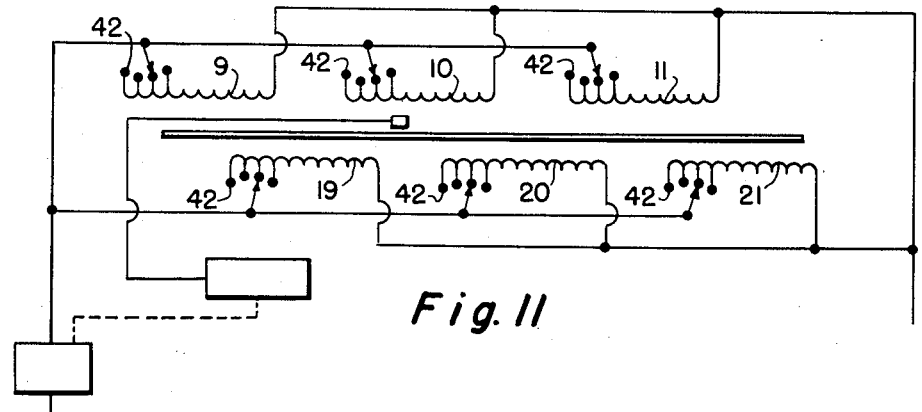
Figure 11 is a simplified schematic wiring diagram of the apparatus of Figure 2.

Control of the amount of flux generated by each pole in the embodiments of Figures 1–4 inclusive, of Figures 16 and 17, and of Figures 18 and 19 assists in producing uniform flux distribution across the work passage. Such control also permits uniform heating of a range of widths up to the maximum for the particular apparatus. As shown in Figure 11, each coil of the embodiment of Figures 1–4 inclusive has a number of taps 42 so that the amount of flux generated by a pole can be varied where a constant power supply is used. The coils of the other two embodiments have similar taps. A variable power supply can also vary the amount of flux generated by each pole independently of the amount of flux produced by the other pole or poles.

The cross section contour of the core structure of Figure 10 affords a means for obtaining good flux distribution across the width of the work passage. As shown, the vertical dimension of the work passage is smaller at the center, thereby presenting less resistance to the travel of magnetic lines of flux at the center of the work passage compared to the travel of magnetic lines of flux at the ends of the work passage. Thus, the lines of flux tend to distribute themselves more uniformly across the work passage width rather than concentrate at the edges. The cross section contour of the core structure of Figure 4 is one means by which we effect uniform flux distribution across the work passage but we also produce substantially the same uniform flux distribution by the control of the amount of flux generated by each pole as pointed out above.

In Figure 8 we have shown the heat pattern developed by a single pole across a portion of the width of a strip when the path of travel of the strip across the face of the pole is parallel to the longitudinal axis of the magnetic field generated by the pole and a second pole not shown. As shown in Figure 8, the pole 31 and its energizing coil 32 develop heat patterns 33 and 34 across the portion 35 of a width of strip. The two heat patterns 33 and 34 do not cover the entire width of the portion 35 and neither pattern extends to the center line 39 of the portion 35.

In Figure 9 we have shown heat patterns developed by a single pole across a portion of the width of a strip when the path of travel of the strip is diagonally across the face of the pole. In other words, the path of travel of the strip is diagonally through the magnetic field generated by this pole and a second pole not shown. As shown in Figure 9 the pole 31a and its energizing coil 32a develop heat patterns 36 and 37 across the portion 35a of a width of strip. Heat pattern 36 extends from edge 38 of the portion 35a to the center line 39a of the portion and heat pattern 37 extends from edge 40 to the center line 39a so that when the portion travels continuously diagonally across the face of the pole 31a, it is heated uniformly across its width. In Figure 9, the strip moves across the face of the pole 31a at an angle of substantially 24° to the longitudinal axis of the pole 31a and to the longitudinal axis of a magnetic field set up by this pole in cooperation with a second pole not shown.

To produce uniform heating across the strip width with the heating pattern illustrated by Figure 9, the strip 41 travels diagonally through the magnetic field 4 of transverse flux and diagonally through the work passage 2 of the core structure 1, shown in Figure 1. Similarly, in the embodiments of Figures 16 and 17 and of Figures 18 and 19, the strip 41 travels diagonally through the magnetic fields of transverse flux which substantially fills the work passages 81 and 115. In other words, the path of travel of the strip is at an angle to the longitudinal axis of the field and the edges of the strip travel through the same or substantially the same length of the magnetic field as the center portion of the strip. We have found that to produce the heating effects shown in Figure 9, the angle which the path of travel of the strip makes with the longitudinal axis of the magnetic field is substantially 5–45°, this angle varying with the number of coils and poles arranged across a side of the work passage.

Figure 14:
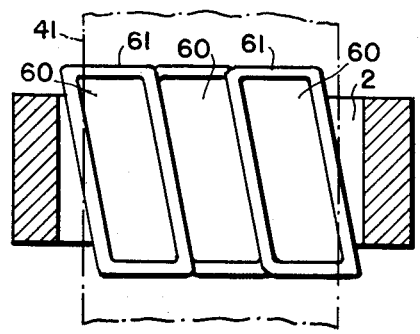
Figures 14 and 15 are plan views showing modifications of our invention.

As shown in Figure 14, another way of arranging the work passage, poles, slots, and path of travel of the strip to provide a diagonal path for the strip 41 through the magnetic field is to make the direction of travel of the strip parallel to the longitudinal axis of the work passage 2 and to position the poles 60 and slots 61 diagonally across each side of the work passage at angles of substantially 5–45° relative to the longitudinal axis of the work passage.

Figure 15:
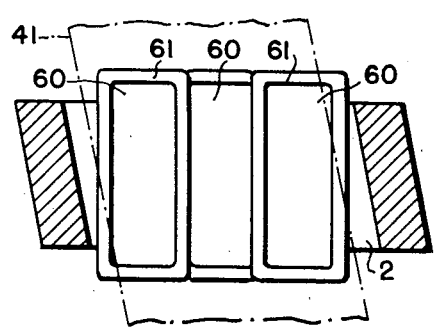

As illustrated by Figure 15, another arrangement which also provides a diagonal path for the strip 41 through the magnetic field comprises locating the work passage 2 and the direction of strip travel diagonally at an angle of substantially 5–45° relative to the poles 60 and slots 61.

Figure 12:
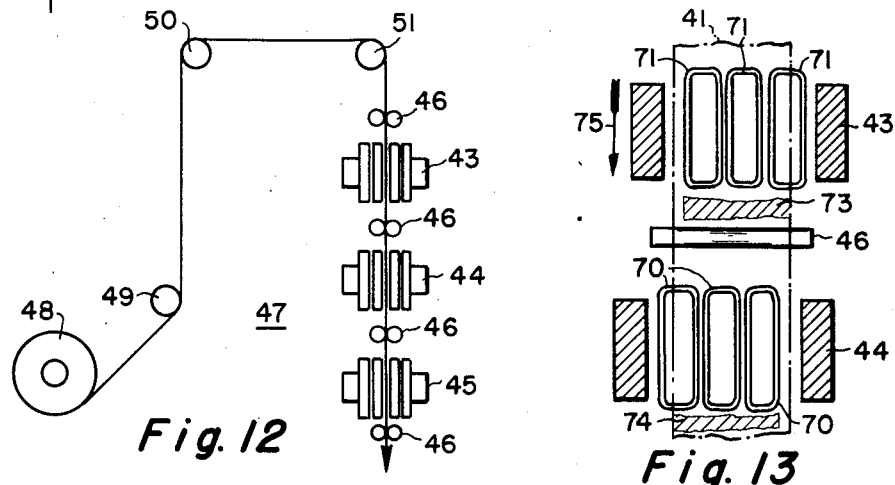
Figure 12 is a schematic drawing of an induction heating line embodying our invention.

As shown in Figure 12, a plurality of our induction heating apparatuses or units arranged in tandem such as that shown in Figure 10 constitutes a production line 47 which heats strip uniformly across its width at speeds of 200 feet per minute and higher. Figure 12 shows three heating units 43, 44 and 45 arranged in tandem with a pair of pinch rolls 46 on each side of each unit for driving and/or guiding the material through the line. Preferably, the pinch rolls are driven to exert a slight tension upon the strip, thereby assisting in maintaining the strip substantially in the center of the width of the work passage.

Figure 13:
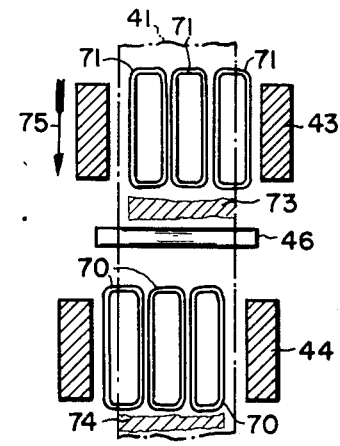
Figure 13 is a diagram showing the location of one heating unit in the line of Figure 12 relative to another unit.

As shown in Figure 13, unit 44 is offset in a transverse direction relative to unit 43 so that the longitudinal center line of each pole 70 of the unit 44 is offset in a transverse direction relative to the longitudinal center line of each pole 71 of the unit 43. Such a disposition of the poles of unit 44 relative to the poles of unit 43 assists in uniformly heating strip across its width where the strip is passed through a tandem arrangement of units by subjecting a portion of the width of the strip traveling therethrough to one part of a magnetic field generated by a pole of one unit and by subjecting that same portion of the width of the strip to a different part of a corresponding magnetic field generated by a pole of a succeeding unit. This disposition of poles may also assist in effecting uniform heating across the width of strip by subjecting a portion of the width of the strip moving through a tandem arrangement of units to the magnetic field generated by a pole or poles of one unit and not subjecting this same portion or a part thereof to a magnetic field generated in a succeeding unit. Referring to Figure 13, uniform heating across the width of strip 41 results from passing the strip through units such as 43 and 44 in the direction of arrow 75 and by subjecting a portion 73 of the width of the strip to the magnetic field generated by poles 71 and by subjecting a different portion 74 of the width of the strip 41 to the magnetic field generated by poles 70. As shown, part of portion 73 is not subjected to poles 70 and part of portion 74 is not subjected to poles 71.

Those parts of portions 73 and 74 which are subjected to the magnetic fields of poles 70 and 71 are subjected to parts of the magnetic fields of poles 70 different from corresponding parts of the magnetic fields of poles 71 since the longitudinal center lines of poles 70 are offset transversely relative to the longitudinal center lines of poles 71.

The operation of the production line 47 is substantially as follows: The strip unwinds from coil 48 and passes over the three billy rolls 49, 50 and 51 and then advances to a pair of pinch rolls 46. Next, the pinch rolls 46 drive the strip successively through units 43, 44 and 45 and maintain the strip under a light tension as it travels through each unit.

Our invention has important advantages which make it highly desirable for heating metal strip and sheet. In the first place, it can heat metal strip and sheet in wide widths and thin gauges uniformly across its width and it effects such heating without edge shields or other additional or auxiliary equipment. Widths up to 66" and higher can be uniformly heated.

In the second place, our apparatus has a high production rate. For example, 1–12 units arranged in tandem heat 25" wide strip uniformly across its width at a rate of 25,000 pounds per hour. Our apparatus has a capacity of at least 2 to 2½ times that of a gas furnace designed for comparable widths, gauges and materials.

In addition to the advantages set forth in the preceding paragraph, the embodiment of Figures 1–4 inclusive has additional advantages. One additional advantage is that it provides substantial operating and installation economies compared to induction heating furnaces having two air gaps. Specifically, this embodiment can establish a transverse magnetic field of equal strength to that established by the two air gap heaters with substantially one-half the exciting current required by the two air gap heaters. A second additional advantage is that this embodiment operates with a power factor substantially twice that of the two air gap furnaces.

While certain present preferred embodiments of the invention have been shown and described, it will be understood that it may be other wise embodied within the scope of the appended claims.

We claim:

1. Induction heating apparatus comprising a magnetizable core structure having a work passage extending lengthwise therethrough for the movement through the work passage of strip metal to be heated, said core structure forming the sides and ends of said work passage, at least two poles spaced across each side of said work passage, said poles having faces extending lengthwise along their respective sides of said work passage, at least one energizing coil for each pole, a field of transverse magnetic flux across said work passage, said field of transverse magnetic flux being generated by said coils connected to a source of power, each coil being so connected to said source of power that for any given direction of current flow, all the poles on one side of the work passage have the same polarity and all the poles on the other side of the work passage the opposite polarity, said work passage extending through said field of magnetic flux and being positioned relative to said poles so that it extends diagonally across the pole faces, and means for moving said strip metal through said work passage.

2. The induction heating apparatus of claim 1 characterized by means for controlling the amount of magnetic flux generated by each pole.

3. Induction heating apparatus comprising a magnetizable core structure having a work passage extending lengthwise therethrough for the movement through the work passage of strip metal to be heated, said core structure forming the sides and ends of said work passage, at least two poles spaced across each side of said passage, said poles having faces extending lengthwise along their respective sides of said work passage, at least one energizing coil for each pole, a field of transverse magnetic flux across said work passage, said field of transverse magnetic flux being generated by said coils connected to a source of power, each coil being so connected to said source of power that for any given direction of current flow all the poles on one side of the work passage have the same polarity and all the poles on the opposite side the opposite polarity, means for moving the strip through said work passage in a path of travel extending through said field of magnetic flux and diagonally across said pole faces.

4. The induction heating apparatus of claim 3 characterized by said path of travel being angularly disposed relative to the longitudinal axis of said field of magnetic flux.

5. The induction heating apparatus of claim 3 characterized by said path of travel being disposed at an angle of substantially 5–45° relative to longitudinal axis of said field of magnetic flux.

6. The induction heating apparatus of claim 3 characterized by said poles on one side of said work passage being disposed angularly relative to the longitudinal axis of said work passage.

7. The induction heating apparatus of claim 3 characterized by said poles on each side of said work passage being disposed angularly relative to the longitudinal axis of the work passage.

8. The induction heating apparatus of claim 3 characterized by said poles on each side of said work passage being disposed angularly relative to the longitudinal axis of said work passage, all the poles one one side of said work passage being disposed at an angle opposite to all of said poles on the other side of said work passage.

9. The induction heating apparatus of claim 1 characterized by said work passage having a cross section contour extending substantially through said core structure which has its thinnest portion adjacent its center and increases in thickness toward the edges.

10. The induction heating apparatus of claim 1 characterized by the poles on one side of said passageway being in a staggered arrangement relative to the poles on the other side of said passageway so that no longitudinal center line of a pole face on one side of said passageway is opposite a center line of a pole face on the opposite side of the passageway.

11. Induction heating apparatus comprising at least two magnetizable core structures arranged in tandem so that thin strip metal may travel consecutively through each core structure, each core structure having a work passage extending lengthwise therethrough for the movement through the work passage of strip to be heated, the work passage of said core structure being formed by the sides and ends of the core structure, having at least two poles spaced across each side of said passage, having said poles having faces extending lengthwise along their respective sides of said work passage, having at least one energizing coil for each pole, having a field of transverse magnetic flux across said work passage, said field of transverse magnetic flux being generated by said coils connected to a source of power, having each coil being so connected to said source of power that for any given direction of current flow, all the poles on one side of the work passage having the same polarity and all the poles on the opposite side of the work passage the opposite polarity, having means for moving the strip through said work passage in a path of travel extending through said field of magnetic flux and diagonally across said pole faces, one of said core structures being arranged relative to a preceding core structure so that the longitudinal center lines of the poles in one core structure are offset in a substantially transverse direction relative to the longitudinal center lines of the poles in the other core structure.

12. Induction heating apparatus comprising at least two magnetizable core structures arranged in tandem so that thin strip metal may travel consecutively through each core structure, each core structure having a work passage extending lengthwise therethrough for the movement through the work passage of strip to be heated, the work passage of said core structure being formed by the sides and ends of the core structure, having at least two poles spaced across each side of said passage, having said poles extending lengthwise along their respective sides of said work passage, having at least one energizing coil for each pole, having a field of transverse magnetic flux across said work passage, said field of transverse magnetic flux being generated by said coils connected to a source of power, having each coil being so connected to said source of power that for any given direction of current flow, all the poles on one side of the work passage having the same polarity and all the poles on the opposite side of the work passage the opposite polarity, having means for moving said strip metal through said work passage one of said core structures being offset in a transverse direction relative to the other core structure so that the longitudinal center lines of the poles in one core structure are offset in a substantially transverse direction relative to the longitudinal center lines of the poles in the other core structure.

13. The induction heating apparatus of claim 3 characterized by having means for controlling the amount of magnetic flux generated by each pole.

14. Induction heating apparatus comprising a magnetizable core structure having a work passage extending lengthwise therethrough for the movement through the work passage of strip metal to be heated, said core structure forming the sides and ends of said work passage, at least two poles spaced across each side of said work passage, said poles having faces extending lengthwise along their respective sides of said work passage, at least one energizing coil for each pole, a field of transverse magnetic flux across said work passage, said field of transverse magnetic flux being generated by said coils connected to a source of power, said work passage extending through said field of magnetic flux and being positioned relative to said poles so that it extends diagonally across the pole faces, and means for moving said strip metal through said work passage.

15. The induction heating apparatus of claim 4 characterized by means for controlling the amount of magnetic flux generated by each pole.

16. Induction heating apparatus comprising a magnetizable core structure having a work passage extending lengthwise therethrough for the movement through the work passage of strip metal to be heated, said core structure forming the sides and ends of said work passage, at least two poles spaced across each side of said passage, said poles having faces extending lengthwise along their respective sides of said work passage, at least one energizing coil for each pole, a field of transverse magnetic flux across said work passage, said field of transverse magnetic flux being generated by said coils connected to a source of power, means for moving the strip through said work passage in a path of travel extending through said field of magnetic flux and diagonally across said pole faces.

17. The induction heating apparatus of claim 16 characterized by said path of travel being angularly disposed relative to the longitudinal axis of said field of magnetic flux.

18. The induction heating apparatus of claim 16 characterized by said path of travel being disposed at an angle of substantially 5–45° relative to longitudinal axis of said field of magnetic flux.

19. The induction heating apparatus of claim 16 characterized by said poles on one side of said work passage being disposed angularly relative to the longitudinal axis of said work passage.

20. The induction heating apparatus of claim 16 characterized by said poles on each side of said work passage being disposed angularly relative to the longitudinal axis of the work passage.

21. The induction heating apparatus of claim 16 characterized by said poles on each side of said work passage being disposed angularly relative to the longitudinal axis of said work passage, all the poles on one side of said work passage being disposed at an angle opposite to all of said poles on the other side of said work passage.

22. The induction heating apparatus of claim 14 characterized by the poles on one side of said passageway being in a staggered arrangement relative to the poles on the other side of said passageway so that no longitudinal center line of a pole face on one side of said passageway is opposite a center line of a pole face on the opposite side of the passageway.

23. Induction heating apparatus comprising at least two magnetizable core structures arranged in tandem so that thin strip metal may travel consecutively through each core structure, each core structure having a work passage etxending lengthwise therethrough for the movement through the work passage of strip to be heated, the work passage of said core structure being formed by the sides and ends of the core structure, having at least two poles spaced across each side of said passage, having said poles having faces extending lengthwise along their respective sides of said work passage, having at least one energizing coil for each pole, having a field of transverse magnetic flux across said work passage, said field of transverse magnetic flux being generated by said coils connected to a source of power, having means for moving the strip through said work passage in a path of travel extending through said field of magnetic flux and diagonally across said pole faces, one of said core structures being arranged relative to a preceding core structure so that the longitudinal center lines of the poles in one core structure are offset in a substantially transverse direction relative to the longitudinal center lines of the poles in the other core structure.

24. Induction heating apparatus comprising at least two magnetizable core structures arranged in tandem so that thin strip metal may travel consecutively through each core structure, each core structure having a work passage extending lengthwise therethrough for the movement through the work passage of strip to be heated, the work passage of said core structure being formed by the sides and ends of the core structure, having at least two poles spaced across each side of said passage, having said poles extending lengthwise along their respective sides of said work passage, having at least one energizing coil for each pole, having a field of transverse magnetic flux across said work passage, said field of transverse magnetic flux being generated by said coils connected to a source of power, having means for moving said strip metal through said work passage, one of said core structures being offset in a transverse direction relative to the other core structure so that the longitudinal center lines of the poles in one core structure are offset in a substantially transverse direction relative to the longitudinal center lines of the poles in the other core structure.

25. The induction heating apparatus of claim 16 characterized by having means for controlling the amount of magnetic flux generated by each pole.

26. Induction heating apparatus comprising a magnetizable core structure having a work passage extending lengthwise therethrough for the movement through the work passage of strip metal to be heated, said core structure forming the sides of said work passage, at least two poles spaced across each side of said work passage, said poles having faces extending lengthwise along their respective sides of said work passage, at least one energizing coil for each pole, a field of transverse magnetic flux across said work passage, said field of transverse magnetic flux being generated by said coils connected to a source of power, said work passage extending through said field of magnetic flux and being positioned relative to said poles so that it extends diagonally across the pole faces, and means for moving said strip metal through said work passage.

27. The induction heating apparatus of claim 26 characterized by means for controlling the amount of magnetic flux generated by each pole.

28. Induction heating apparatus comprising a magnetizable core structure having a work passage extending lengthwise therethrough for the movement through the work passage of strip metal to be heated, said core structure forming the sides of said work passage, at least two poles spaced across each side of said passage, said poles having faces extending lengthwise along their respective sides of said work passage, at least one energizing coil for each pole, a field of transverse magnetic flux across said work passage, said field of transverse magnetic flux being generated by said coils connected to a source of power, means for moving the strip through said work passage in a path of travel extending through said field of magnetic flux and diagonally across said pole faces.

29. The induction heating apparatus of claim 28 characterized by said path of travel being angularly disposed relative to the longitudinal axis of said field of magnetic flux.

30. The induction heating apparatus of claim 28 characterized by said path of travel being disposed at an angle of substantially 5–45° relative to longitudinal axis of said field of magnetic flux.

31. The induction heating apparatus of claim 28 characterized by said poles on one side of said work passage being disposed angularly relative to the longitudinal axis of said work passage.

32. The induction heating apparatus of claim 28 characterized by said poles on each side of said work passage being disposed angularly relative to the longitudinal axis of the work passage.

33. The induction heating apparatus of claim 28 characterized by said poles on each side of said work passage being disposed angularly relative to the longitudinal axis of said work passage, all the poles on one side of said work passage being disposed at an angle opposite to all of said poles on the other side of said work passage.

34. Induction heating apparatus comprising at least two magnetizable core structures arranged in tandem so that thin strip metal may travel consecutively through each core structure, each core structure having a work passage extending lengthwise therethrough for the movement through the work passage of strip to be heated, the work passage of said core structure being formed by the sides of the core structure, having at least two poles spaced across each side of said passage, having said poles having faces extending lengthwise along their respective sides of said work passage, having at least one energizing coil for each pole, having a field of transverse magnetic flux across said work passage, said field of transverse magnetic flux being generated by said coils connected to a source of power, having means for moving the strip through said work passage in a path of travel extending through said field of magnetic flux and diagonally across said pole faces, one of said core structures being arranged relative to a preceding core structure so that the longitudinal center lines of the poles in one core structure are offset in a substantially transverse direction relative to the longitudinal center lines of the poles in the other core structure.

35. Induction heating apparatus comprising at least two magnetizable core structures arranged in tandem so that thin strip metal may travel consecutively through each core structure, each core structure having a work passage extending lengthwise therethrough for the movement through the work passage of strip to be heated, the work passage of said core structure being formed by the sides of the core structure, having at least two poles spaced across each side of said passage, having said poles extending lengthwise along their respective sides of said work passage, having at least one energizing coil for each pole, having a field of transverse magnetic flux across said work passage, said field of transverse magnetic flux being generated by said coils connected to a source of power, having means for moving said strip metal through said work passage, one of said core structures being offset in a transverse direction relative to the other core structure so that the longitudinal center lines of the poles in one core structure are offset in a substantially transverse direction relative to the longitudinal center lines of the poles in the other core structure.

36. A method of heating strip metal comprising generating a field of transverse magnetic flux across a work passage of a furnace through which work passage metal strip travels by delivering electric power to coils for poles spaced across each side of the work passage, said poles having faces extending lengthwise along their respective sides of said work passage and passing the strip metal in a path of travel extending through said field of magnetic flux and diagonally across said pole faces.

37. The method of claim 36 characterized by passing the strip metal through the field of magnetic flux at an angle of substantially 5–45° to the longitudinal axis of said field of magnetic flux.

38. The method of claim 36 characterized by controlling the amount of magnetic flux generated by each pole by regulating the amount of electric power delivered to a coil for said pole.

39. The apparatus of claim 3 characterized by said path of travel for the strip metal so extending through said field of magnetic flux that the edges of the strip travel through substantially the same length of said field of magnetic flux as the center portions of the strip.

40. The apparatus of claim 11 characterized by said path of travel for the strip metal for each of said core structures so extending through each field of magnetic flux that the edges of the strip travel through substantially the same length of each field of magnetic flux as the center portions of the strip.

41. The apparatus of claim 16 characterized by said path of travel for the strip metal so extending through said field of magnetic flux that the edges of the strip travel through substantially the same length of said field of magnetic flux as the center portions of the strip.

42. The apparatus of claim 23 characterized by said path of travel for the strip metal for each core structure so extending through each field of magnetic flux that the edges of the strip travel through substantially the same length of each field of magnetic flux as the center portions of the strip.

43. The apparatus of claim 28 characterized by said path of travel for the strip metal so extending through said field of magnetic flux that the edges of the strip travel through substantially the same length of said field of magnetic flux as the center portions of the strip.

44. The apparatus of claim 34 characterized by said path of travel for strip metal through each core structure so extending through each field of magnetic flux that the edges of the strip travel through substantially the same length of each field as the center portions of the strip.

45. The method of claim 36 characterized by so passing the strip metal through said field of magnetic flux that the edges of said strip travel through substantially the same length of said field as the center portions of the strip.

46. A method of heating strip metal, comprising generating at least two fields of transverse magnetic flux arranged substantially in tandem, each field being generated across a work passage of a furnace through which work passage metal strip travels by delivering electric power to coils for poles spaced across each side of each work passage, said poles having faces extending lengthwise along the respective sides of said work passage, and passing the strip metal through each work passage in a path of travel extending through each of said fields of transverse magnetic flux and diagonally across the pole faces.

47. The method of claim 46 characterized by passing the strip metal through each field of transverse magnetic flux at an angle of substantially 5–45° to the longitudinal axis of each of said fields.

48. The method of claim 46 characterized by controlling the amount of magnetic flux generated by each pole of each field by regulating the amount of electric power delivered to a coil for said pole.

49. A method of heating metal strip comprising generating at least two fields of transverse magnetic flux arranged substantially in tandem, each field being generated across a work passage of a furnace through which work passage metal strip travels by delivering electric power to coils for poles spaced across each side of each work passage, said poles having faces extending lengthwise along the respective sides of said work passage and passing the metal strip through each work passage in a path of travel extending through each of said fields of transverse magnetic flux and diagonally across the pole faces so that a portion of the width of metal strip subjected to one field of transverse magnetic flux avoids subjection to a field of transverse magnetic flux next in succession.

50. The method of claim 49 characterized by passing the strip metal through each of said fields of transverse magnetic flux at an angle of substantially 5–45° to the longitudinal axis of each of said fields.

51. The method of claim 49 characterized by controlling the amount of magnetic flux generated by each pole of each field by regulating the amount of electric power delivered to a coil for said pole.

52. The method of claim 46 characterized by so passing the strip metal through each of said fields of transverse magnetic flux that the edges of the strip travel through substantially the same length of each of said fields as the center portions of the strip.

53. Induction heating apparatus comprising at least two magnetizable core structures arranged in tandem so that strip metal travels consecutively through each core structure, each core structure having a work passage extending lengthwise therethrough for the movement through the work passage of strip to be heated, the work passage of said core structure being formed by the sides of the core structure, having at least two poles spaced across each side of said work passage, having said poles having faces extending lengthwise along their respective sides of said work passage, having at least one energizing coil for each pole, having a field of transverse magnetic flux across said work passage, said field of transverse magnetic flux being generated by said coils connected to a source of power, having means for moving the strip through the work passage in a path of travel extending through the field of magnetic flux and diagonally across the pole faces.

54. Induction heating apparatus comprising at least two magnetizable core structures arranged in tandem so that strip metal travels consecutively through each core structure, each core structure having a work passage extending lengthwise therethrough for the movement through the work passage of strip to be heated, the work passage of said core structure being formed by the sides and the ends of the core structure, having at least two poles spaced across each side of said work passage, having said poles having faces extending lengthwise along their respective sides of said work passage, having at least one energizing coil for each pole, having a field of transverse magnetic flux across said work passage, said field of transverse magnetic flux being generated by said coils connected to a source of power, having means for moving the strip through the work passage in a path of travel extending through the field of magnetic flux and diagonally across the pole faces.

55. Induction heating apparatus comprising at least two magnetizable core structures arranged in tandem so that strip metal travels consecutively through each core structure, each core structure having a work passage extending lengthwise therethrough for the movement through the work passage of strip to be heated, the work passage of said core structure being formed by the sides of the core structure, having at least two poles spaced across each side of said work passage, having said poles, each having a face extending lengthwise along their respective sides of said work passage, having at least one energizing coil for each pole, having a field of transverse magnetic flux across said work passage, said field of transverse magnetic flux being generated by said coils connected to a source of power, having said work passage extending through said field of transverse magnetic flux and being positioned relative to said poles so that it extends diagonally across the pole faces and having means for moving said strip metal through said work passage.

56. Induction heating apparatus comprising at least two magnetizable core structures arranged in tandem so that strip metal travels consecutively through each core structure, each core structure having a work passage extending lengthwise therethrough for the movement through the work passage of strip to be heated, the work passage of said core structure being formed by the sides and the ends of the core structure, having at least two poles spaced across each side of said work passage, having said poles extending lengthwise along their respective sides of said work passage, having at least one energizing coil for each pole, having a field of transverse magnetic flux across said work passage, said field of transverse magnetic flux being generated by said coils connected to a source of power, having said work passage extending through said field of transverse magnetic flux and being positioned relative to said poles so that it extends diagonally across the pole faces and having means for moving said strip metal through said work passage.

References Cited in the file of this patent

UNITED STATES PATENTS 2,448,009    Baker _____ Aug. 31, 1948

FOREIGN PATENTS 712,066    Great Britain _____ July 14, 1954

UNITED STATES PATENT OFFICE

CERTIFICATE OF CORRECTION

Patent No. 2,902,572 September 1, 1959

Robert V. Lackner et al.

It is hereby certified that error appears in the printed specification of the above numbered patent requiring correction and that the said Letters Patent should read as corrected below.

Column 3, line 46, for "disposed as the poles" read -- disposed as are the poles --; column 10, line 3, for "one one side" read -- on one side --; column 11, line 17, for the claim reference numeral "4" read -- 14 --; line 68, for "etxending" read -- extending --.

Signed and sealed this 15th day of March 1960.

(SEAL)
Attest:

KARL H. AXLINE
Attesting Officer

ROBERT C. WATSON
Commissioner of Patents